(12) United States Patent
Fu et al.

(10) Patent No.: US 12,044,601 B2
(45) Date of Patent: Jul. 23, 2024

(54) DISPLACEMENT RECONSTRUCTION METHOD FOR LATTICE TOWER STRUCTURE BASED ON IMPROVED MODE SUPERPOSITION

(71) Applicant: DALIAN UNIVERSITY OF TECHNOLOGY, Liaoning (CN)

(72) Inventors: Xing Fu, Liaoning (CN); Qing Zhang, Liaoning (CN); Liang Ren, Liaoning (CN); Hongnan Li, Liaoning (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 443 days.

(21) Appl. No.: 17/628,765

(22) PCT Filed: Jul. 26, 2021

(86) PCT No.: PCT/CN2021/108398
§ 371 (c)(1),
(2) Date: Jan. 20, 2022

(87) PCT Pub. No.: WO2023/004534
PCT Pub. Date: Feb. 2, 2023

(65) Prior Publication Data
US 2023/0251160 A1 Aug. 10, 2023

(51) Int. Cl.
*G01M 5/00* (2006.01)
*E04H 12/10* (2006.01)

(52) U.S. Cl.
CPC ........ *G01M 5/0041* (2013.01); *G01M 5/0025* (2013.01); *E04H 12/10* (2013.01)

(58) Field of Classification Search
CPC ............ G01M 5/0041; G01M 5/0025; G01M 5/0066; G01M 5/0058; E04H 12/10
See application file for complete search history.

(56) References Cited

U.S. PATENT DOCUMENTS

| 2012/0278011 A1* | 11/2012 | Lancaster | ......... H02J 13/00002 702/57 |
| 2014/0136140 A1* | 5/2014 | Chan | ........................ H02G 7/14 702/141 |
| 2020/0025644 A1* | 1/2020 | Brinker | ................ G08B 21/182 |

FOREIGN PATENT DOCUMENTS

| CN | 107103111 A | 8/2017 |
| CN | 107330176 A | 11/2017 |
| CN | 109543258 A | 3/2019 |

OTHER PUBLICATIONS

Qing Zhang et al.;"Modal parameters of a transmission tower considering the coupling effects between the tower and lines"; Oct. 1, 2020; Engineering Structures; 16 pages.

* cited by examiner

*Primary Examiner* — Lam S Nguyen
(74) *Attorney, Agent, or Firm* — MUNCY, GEISSLER, OLDS & LOWE, PC

(57) ABSTRACT

The present invention belong to the technical field of lattice tower structure monitoring, and discloses a displacement reconstruction method for a lattice tower structure based on improved mode superposition. The method comprises: uniformly arranging D strain sensors on main member of a lattice tower along the height, processing collected strain data $\{\varepsilon\}_{D \times 1}$ using a stochastic subspace identification (SSI) method to obtain a matrix $[\Psi]_{D \times n}^{T}$ of first n-order strain modes; calculating a function relation y(x) between a distance from a measuring point to a neutral layer and a height according to a lattice tower design drawing; performing polynomial fitting on the first n-order strain modes with a height coordinate x of the lattice tower respectively to obtain a strain mode function $\Psi_i(x)$, expanding a function $$\frac{\Psi_i(x)}{y(x)}$$

according to a Taylor formula, performing double integration on the expansion result and substituting same into a (Continued)

boundary condition, to obtain a displacement mode function $\Phi_i(x)$; evaluating a modal coordinate $\{q\}_{n\times 1}$ by means of the least square method, substituting the height coordinate x of a displacement object point to be reconstructed, and multiplying the displacement mode function value $\Phi_i(x)$ by the modal coordinate $\{q\}_{n\times 1}$. The improved mode superposition method of the present invention has the advantages of a small number of sensors required, simple calculation process, accurate calculation result, and strong operability and practicality.

1 Claim, 2 Drawing Sheets

(a) (b)

DISPLACEMENT RECONSTRUCTION METHOD FOR LATTICE TOWER STRUCTURE BASED ON IMPROVED MODE SUPERPOSITION

TECHNICAL FIELD

The present invention belongs to the technical field of lattice tower structure monitoring, and particularly relates to a displacement reconstruction method for a lattice tower structure.

BACKGROUND

A lattice tower structure plays an important role in modern industry because of being used in radio and television broadcasting, power and microwave transmission, meteorological measurement, wind energy production and other practical projects, so there is a need to carry out related researches on structure health monitoring and vibration control of a lattice tower. Among numerous monitoring indexes, displacement is very important because of directly relating to structure compliance. However, for the lattice tower, the dynamic displacement during service is difficult to measure directly because of structure characteristics and costs thereof. Indirect calculation of the dynamic displacement using existing health monitoring data is of great research value.

In the field of bridge engineering, many researches on dynamic displacement reconstruction have been carried out. For example, double integration is performed by using acceleration to acquire structure displacement, and the integration error is corrected by using the baseline correction technique. Alternatively, an FIR filter is designed to guide the acceleration integration process and accurately measure high-frequency displacement of a bridge structure. Because acceleration measurements are relatively simple, these two methods are widely used. However, if the structure displacement response is a non-zero mean or pseudo-static component, reconstruction cannot be performed accurately using acceleration. See THONG Y K, WOOLFSON M S, CROWE J A, et al. Numerical double integration of acceleration measurements in noise [J]. Measurement, 2004, 36(1): 73-92.and LEE H S, HONG Y H, PARK H W. Design of an FIR filter for the displacement reconstruction using measured acceleration in low-frequency dominant structures [J]. International Journal for Numerical Methods in Engineering, 2010, 82(4): 403-34 for details. Since having the same modal coordinates as displacement, strain response can accurately reflect the displacement response of various components, thereby being studied for displacement reconstruction. A strain-displacement transformation matrix is derived using mode shapes, and the shape of an aluminum plate can be reconstructed from discrete measured strains. Alternatively, the displacement time course of any measuring point is reconstructed from the strain time courses of a plurality of measuring points using the mode superposition method. See THOMAS J, GURUSAMY S, RAJANNA T R, et al. Structural shape estimation by mode shapes using fiber bragg grating sensors: A genetic algorithm approach [J]. IEEE Sensors Journal, 2020, 20(6): 2945-52. and WANG Z-C, GENG D, REN W-X, et al. Strain modes based dynamic displacement estimation of beam structures with strain sensors [J]. Smart Materials and Structures, 2014, 23(12): 125045 for details. However, the existing mode superposition method is only suitable for constant cross-section beams, and is not suitable for lattice tower structures. There is no corresponding displacement reconstruction method for lattice tower structures as spatial lattice structures.

In view of the defect that the existing method is only suitable for constant cross-section beams, the present invention proposes a displacement reconstruction method suitable for a lattice tower structure, and an improved mode superposition method, the core of which lies in: uniformly arranging strain sensors within the tower height range, identifying strain modes using the existing stochastic subspace identification (SSI) method, and calculating displacement modes and modal coordinates, to achieve the purpose of displacement reconstruction, to provide a new method for indirectly measuring dynamic displacement of any measuring point of the lattice tower structure.

SUMMARY

The present invention proposes a dynamic displacement reconstruction method for a lattice tower structure, i.e. an improved mode superposition method, to provide a new method for indirect measurement of dynamic displacement of any measuring point of the lattice tower structure.

The technical solution of the present invention is as follows:

A displacement reconstruction method for a lattice tower structure based on improved mode superposition, characterized in that a lattice tower is simplified into a thin-walled variable cross-section cantilever beam, a neutral layer is assumed to be located between two main members, a stochastic subspace identification method is introduced to identify strain modes, judge order of participating modes, and reduce the amount of calculation, and an existing mode superposition method is improved into a method suitable for variable cross-section structures, comprising the following steps:

(1) uniformly arranging D strain sensors on main member of a lattice tower along the height direction, the number of the strain sensors is at least four;

(2) processing strain $\{\varepsilon\}_{D\times 1}$ collected by the strain sensors using a stochastic subspace identification (SSI) method, drawing a stabilization diagram according to the processing result, judging order n of modes participating in vibration according to the obtained stabilization diagram, where n is a natural number and does not exceed D, and extracting a matrix $[\Psi]_{D\times n}^T$ of first n-order strain modes;

(3) calculating a function relation y(x) between a horizontal distance y from any point of the main member to the neutral layer and a height x from the point to the ground according to a lattice tower design drawing;

(4) performing polynomial fitting on the first n-order strain modes with the height x from the strain sensor arrangement points to the ground to obtain a strain mode function $\Psi_i(x)$, expanding a function $$\frac{\Psi_i(x)}{y(x)}$$

according to a Taylor formula, performing double integration on the expansion result and substituting same into a boundary condition fixedly connected to the bottom of the lattice tower structure, to obtain a displacement mode function $\Phi_i(x)$;

$$\frac{\Psi_i(x)}{y(x)} = f(x) = \frac{f(x_0)}{0!} + \frac{f'(x_0)}{1!}(x-x_0) + \quad (1)$$

$$\frac{f''(x_0)}{2!}(x-x_0)^2 + \ldots + \frac{f^n(x_0)}{n!}(x-x_0)^n + R_n(x)$$

$$\Phi_i(x) = \left(-\int\int f(x)dx^2\right) \quad (2)$$

(5) in the case where the strain mode matrix $[\Psi]_{D\times n}{}^T$ and the strain data $\{\varepsilon\}_{D\times 1}$ of the lattice tower are known, evaluating a modal coordinate $\{q\}_{n\times 1}$ of the lattice tower in the vibration process by means of the least square method;

$$\{q\}_{n\times 1} = ([\Psi]_{D\times n}{}^T \cdot [\Psi]_{D\times n})^{-1} \cdot [\Psi]_{D\times n}{}^T \cdot \{\varepsilon\}_{D\times 1} \quad (3)$$

(6) substituting the height coordinate x of any point of the lattice tower into the displacement mode function $\Phi_i(x)$, and multiplying the obtained displacement mode function value $\Phi_i(x)$ by the modal coordinate $\{q\}_{n\times 1}$ to obtain dynamic displacement of the point.

The present invention has the following beneficial effects:
(1) The improved mode superposition method uses the SSI method to accurately identify the strain modes of a lattice tower in the case of a small number of measuring points, which greatly reduces the number of sensors;
(2) The improved mode superposition method can reconstruct the dynamic displacement of the lattice tower at any position by only using the strain response, which solves the problem that displacement is difficult to measure directly;
(3) The improved mode superposition method only needs to install strain sensors on the lattice tower, which is easy to implement, convenient to calculate and has strong operability.

DETAILED DESCRIPTION

To make the purpose, features and advantages of the present invention more clear and legible, the technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Figure 1:
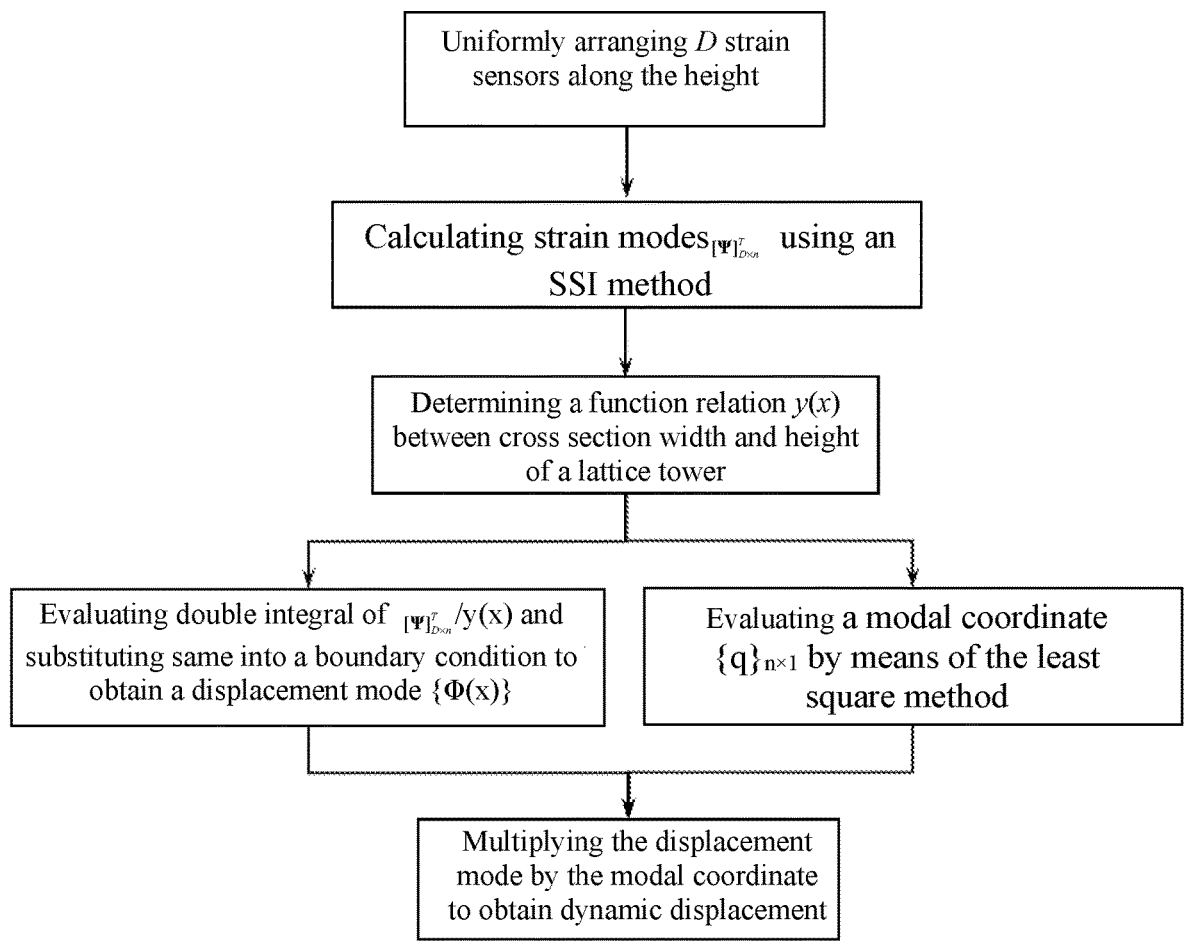
FIG. 1 is a flow chart of implementation of the present invention.
Figure 2:
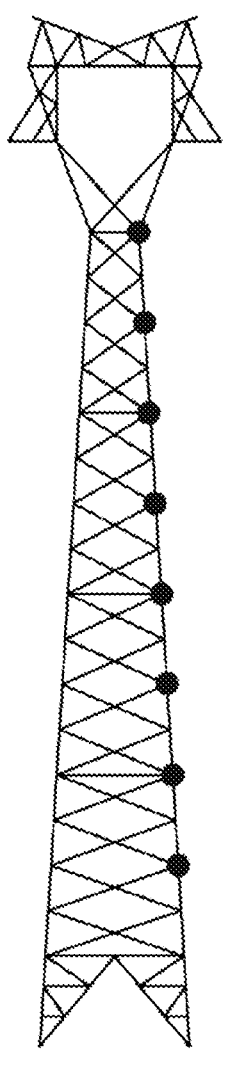
FIG. 2 is an arrangement diagram of sensors of a lattice tower; FIG. (a) is a front view of a lattice tower, where circles represent strain sensors; and FIG. (b) is a side view of a lattice tower, where dotted line represents an imaginary neutral layer.
Figure 2:
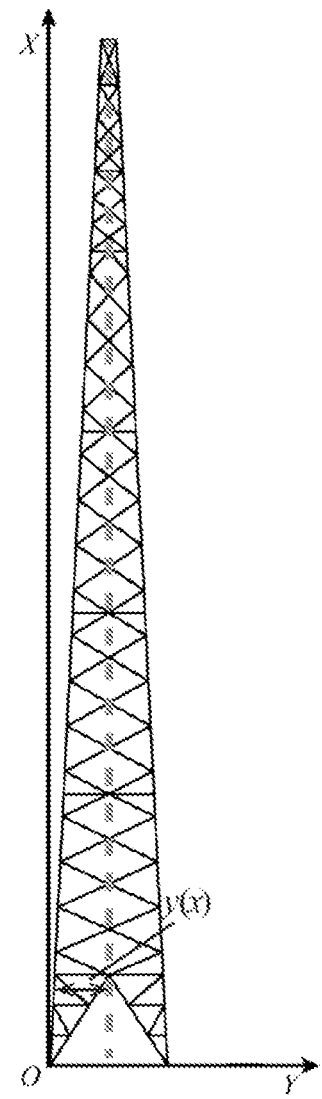

Referring to FIG. 1 to FIG. 2, embodiments of the present invention propose a displacement reconstruction method for a lattice tower structure.

For implementation case data source, see ZHANG Q, FU X, REN L, et al. Modal parameters of a transmission tower considering the coupling effects between the tower and lines [J]. Eng Struct, 2020, 220(110947) for details.

In an embodiment of the present invention, self-compiled programs or related commercial software may be used for building and transient analysis of a numerical model of the lattice tower. In this embodiment, by taking the widely-used finite element analysis software ANSYS as an example, the application of the improved mode superposition method to the lattice tower structure is achieved, which is specifically described with reference to the flow shown in FIG. 1 and the technical solution of the present invention:

(1) The lattice tower in the embodiment is a self-supporting tower with a total height of 34 m, and is made of Q235 equal-leg angle steel. For tower structure information, see "FIG. 6" in "ZHANG Q, FU X, REN L, et al. Modal parameters of a transmission tower considering the coupling effects between the tower and lines [J]. Eng Struct, 2020, 220(110947)" for details. A finite element model of the tower is built using the software ANSYS, a beam 188 element is selected to simulate a lattice tower pole, connection between members is simplified using rigid nodes, and an ideal elastic-plastic model is used as a constitutive model for steel.

Since the first three-order modes need to be considered in the improved mode superposition method, eight strain measuring points are arranged in this embodiment. The above numerical model of the lattice tower is built according to the design drawing.

(2) For horizontal load applied in this embodiment, see "FIG. 6" in "ZHANG Q, FU X, REN L, et al. Modal parameters of a transmission tower considering the coupling effects between the tower and lines [J]. Eng Struct, 2020, 220(110947)" for details. The solution type analyzed by software ANSYS is "antype,trans", and the strain response of a strain measuring point can be extracted after the applied load is evaluated. Then, the strain response obtained is processed using the SSI method, assuming that the order is set to 100, the identified strain modes and corresponding height coordinates are extracted.

(3) A function relation between a distance from a point of the main material to the neutral layer and a height coordinate is calculated according to a dimension of a lattice tower design drawing, which is a linear function relation in this embodiment.

(4) Performing polynomial fitting on the strain modes with the height coordinate of the lattice tower respectively to obtain a strain mode function, expanding a function $$\frac{\Psi_i(x)}{y(x)}$$

according to a Taylor formula, performing double integration on the expansion result and substituting same into a boundary condition, to obtain a displacement mode function $\Phi_i(x)$.

(5) Evaluating a mode coordinate by means of the strain response and strain mode using the least square method.

(6) Substituting the height coordinate at the object point into the displacement mode function to evaluate a function value, and multiplying the displacement mode function value by the mode coordinate to obtain dynamic displacement.

Attention shall be paid during the use of the present invention: firstly, the number of strain measuring points of the lattice tower is at least four; and secondly, transient analysis technique is a mature and well-known technique in the art, and self-compiled programs or related commercial software may be used for building and transient analysis of a numerical model of the lattice tower.

The above embodiments are only used for describing the technical solution of the present invention rather than limiting the same. Although the present invention is described in detail by referring to the above embodiments, those ordinary skilled in the art should understand that the technical solution recorded in each of the above embodiments can be still amended, or some technical features therein can be replaced equivalently. However, these amendments or replacements do not enable the essence of the corresponding technical solutions to depart from the spirit and the scope of the technical solutions of various embodiments of the present invention.

The invention claimed is:

1. A displacement reconstruction method for a lattice tower structure based on improved mode superposition, characterized in that a lattice tower is simplified into a thin-walled variable cross-section cantilever beam, a neutral layer is assumed to be located between two main members, a stochastic subspace identification method is introduced to identify strain modes, judge order of participating modes, and reduce the amount of calculation, and an existing mode superposition method is improved into a method suitable for variable cross-section structures, comprising the following steps:

(1) uniformly arranging D strain sensors on main member of a lattice tower along the height direction, the number of the strain sensors is at least four;

(2) processing strain data $\{\varepsilon\}_{D\times1}$ collected by the strain sensors using a stochastic subspace identification method, drawing a stabilization diagram according to the processing result, judging order n of modes participating in vibration according to the obtained stabilization diagram, where n is a natural number and does not exceed D, and extracting a matrix $[\Psi]_{D\times n}^T$ of first n-order strain modes;

(3) calculating a function relation y(x) between a horizontal distance y from any point of the main member to the neutral layer and a height x from the point to the ground according to a lattice tower design drawing;

(4) performing polynomial fitting on the first n-order strain modes with the height x from the strain sensor arrangement points to the ground respectively to obtain a strain mode function $\Psi_i(x)$, expanding a function $$\frac{\Psi_i(x)}{y(x)}$$

according to a Taylor formula, performing double integration on the expansion result and substituting same into a boundary condition fixedly connected to the bottom of the lattice tower structure, to obtain a displacement mode function $\Phi_i(x)$;

(5) in the case where the strain mode matrix $[\Psi]_{D\times n}^T$ and the strain data $\{\varepsilon\}_{D\times1}$ of the lattice tower are known, evaluating a modal coordinate $\{q\}_{n\times1}$ of the lattice tower in the vibration process by means of the least square method;

(6) substituting the height coordinate x of any point of the lattice tower into the displacement mode function $\Phi_i(x)$, and multiplying the obtained displacement mode function value $\Phi_i(x)$ by the modal coordinate $\{q\}_{n\times1}$ to obtain dynamic displacement of the point.

* * * * *